(12) United States Patent
Williams et al.

(10) Patent No.: US 7,445,747 B2
(45) Date of Patent: Nov. 4, 2008

(54) APPARATUS FOR INJECTING SOLID PARTICULATE MATERIAL INTO A VESSEL

(75) Inventors: Trevor Williams, Boweya via Glenrowan (AU); Barry Alan Cady, Chelsea (AU)

(73) Assignee: Technological Resources PTY Limited, Melbourne, Victoria (AU)

( * ) Notice: Subject to any disclaimer, the term of this patent is extended or adjusted under 35 U.S.C. 154(b) by 0 days.

(21) Appl. No.: 11/188,993

(22) Filed: Jul. 26, 2005

(65) Prior Publication Data

US 2006/0071376 A1    Apr. 6, 2006

(30) Foreign Application Priority Data

Jul. 27, 2004    (AU)    ............... 2004904199
Dec. 30, 2004   (AU)    ............... 2004907375

(51) Int. Cl.
  *C21C 5/32*    (2006.01)
(52) U.S. Cl. .................. 266/225; 266/268; 266/270
(58) Field of Classification Search .............. 266/225, 266/270, 268
  See application file for complete search history.

(56) References Cited

U.S. PATENT DOCUMENTS

| | | | |
|---|---|---|---|
| 6,245,285 B1 * | 6/2001 | Dry et al. | 266/270 |
| 6,398,842 B2 * | 6/2002 | Dunne | 266/225 |
| 6,400,747 B1 | 6/2002 | Mathur | |
| 6,565,800 B2 * | 5/2003 | Dunne | 266/225 |
| 2001/0015516 A1 | 8/2001 | Dunne | |

FOREIGN PATENT DOCUMENTS

GB    993 172 A    5/1965

OTHER PUBLICATIONS

Mathur, P.C., "CoJet™ Technology-Principles and Actual Results from Recent Installations," AISE Steel Technology, vol. 78, No. 5, May 2001, pp. 21-25.

* cited by examiner

*Primary Examiner*—Scott Kastler
(74) *Attorney, Agent, or Firm*—Finnegan, Henderson, Farabow, Garrett & Dunner, L.L.P.

(57) ABSTRACT

Smelting apparatus comprises a vessel (11) and a solids injection lance (27a) extending through an opening in the wall of vessel barrel (16) into the interior space of the vessel. Lance (27a) includes a central core tube (31) through which to pass solid particulate material into the vessel and an annular cooling jacket (32) surrounding the central core tube (31) throughout a substantial part of its length. Lance (27a) has a mounting structure (61) comprising a tubular part (60) extended about cooling jacket (32) and about twice the diameter of the cooling jacket. Tubular part (60) fits within a tubular lance mounting bracket (62) welded to the shell (16a) of vessel barrel (16) to extend outwardly from the vessel. The lance is held within mounting bracket (62) by clamping bolts acting between flanges (63,65) on tubular part (60) and tubular bracket (62). Tubular part (60) is double walled and the interior space between its walls is divided into water flow passages through which cooling water flows from a water inlet (68) to an outlet (69).

11 Claims, 7 Drawing Sheets

APPARATUS FOR INJECTING SOLID PARTICULATE MATERIAL INTO A VESSEL

TECHNICAL FIELD

The present invention provides a metallurgical lance which extends into a vessel for injecting solid particulate material into a vessel. Apparatus of this kind may be used for injecting metallurgical feed material into the molten bath of a smelting vessel for producing molten metal, for example by a direct smelting process.

A known direct smelting process, which relies on a molten metal layer as a reaction medium, and is generally referred to as the HIsmelt process, is described in International application PCT/AU/96/00197 (WO 96/31627) in the name of the applicant.

The HIsmelt process as described in the International application comprises:
(a) forming a bath of molten iron and slag in a vessel;
(b) injecting into the bath;
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solid material into the metal layer in the bottom of the vessel. The lances must withstand operating temperatures of the order of 1400° C. within the smelting vessel. Each lance must accordingly have an internal forced cooling system to operate successfully in this harsh environment and must be capable of withstanding substantial local temperature variations.

U.S. Pat. No. 6,398,842 discloses one form of lance which is able to operate effectively under these conditions. In that construction the solid particulate material is passed through a central core tube which is fitted closely within an outer annular cooling jacket, the forward end of the core tube extending through and beyond the forward end of the cooling jacket into the metallurgical vessel.

Our Australian Provisional Application No. 2004906033 filed Oct. 18, 2004 discloses a smelting apparatus in which a solids injection lance is mounted in a smelting vessel in a manner which facilitates withdrawal of the lance following a smelting operation. The present application is directed to a lance construction which will have particular use in apparatus of the general kind disclosed in Application 2004906033, but is not limited to such use.

DISCLOSURE OF THE INVENTION

According to the invention, there is provided a metallurgical lance to extend into a vessel for injecting solid particulate material into a molten material held within the vessel, comprising:

a central core tube through which to pass the solid particulate material;

an annular cooling jacket surrounding the central core tube throughout a substantial part of its length and provided with internal water flow passages for flow of cooling water therethrough; and an outer annular part disposed about the annular cooling jacket at a position spaced back from the forward end of the lance and provided with internal water flow passages for flow of cooling water therethrough.

The outer annular part may be cylindrical and have an outer diameter at least 1.5 times the outer diameter of the cooling jacket. It may be of the order of twice the diameter of the cooling jacket.

The outer annular part may be double walled with the water flow passages formed between the double walls.

An annular space between the double walls of the annular part may be partitioned to form the water flow passages.

Specifically, the space between the double walls of the outer annular part may be partitioned by longitudinally extending partitions to divide the space into longitudinally extending, circumferentially spaced, water flow passages interconnected for water flow sequentially through those passages.

The outer annular part may be spaced radially outwardly from the annular cooling jacket by front and rear end connectors so as to form an annular void between the outer annular part and the jacket.

The forward end of the outer annular part may be inclined at an acute angle to a central longitudinal axis of the lance.

The lance may be of elongate formation and be self supporting within the outer annular part. It may typically be more than 5 meters in length and the outer radius of the cooling jacket may typically be of the order of 100 to 150 mm.

BRIEF DESCRIPTION OF THE DRAWINGS

In order that the invention may be more fully explained, particular embodiments will be described in some detail with reference to the accompanying drawings in which.

DETAILED DESCRIPTION OF THE PREFERRED EMBODIMENT

Figure 1:
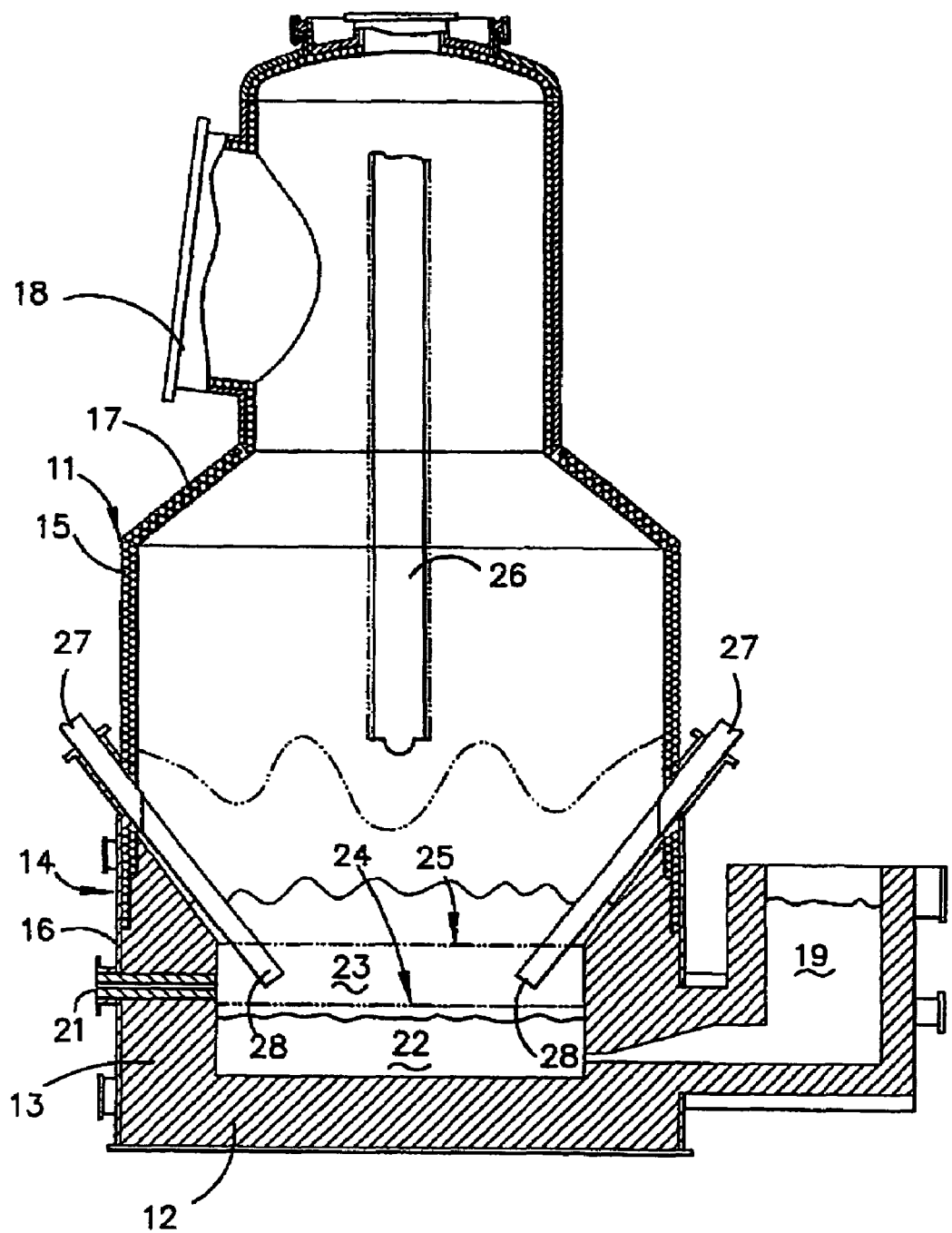
FIG. 1 is a vertical cross section through a metallurgical vessel incorporating solids injection lances constructed in accordance with the invention.

FIG. 1 illustrates a direct smelting vessel suitable for operation by the HIsmelt process as described in International Patent Application PCT/AU96/00197. The metallurgical vessel is denoted generally as 11 and has a hearth that includes a base 12 and sides 13 formed from refractory bricks; side walls 14 forming a generally cylindrical barrel which extends upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and a series of solids injection lances 27 extending downwardly and inwardly through the side walls 14 and into the slag layer 23 for injecting iron ore, solid carbonaceous material, and fluxes entrained in an oxygen deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

Lances 27 may be of two kinds, a first of which is employed to inject hot ore material and the other of which is employed to inject carbonaceous material such as coal. There may for example be eight solids injection lances 27 spaced circumferentially around the vessel and consisting of a series of four hot ore injection lances and four coal injection lances spaced between the hot ore injection lances. All of the lances may fit within outer housings of a common construction but the two kinds of lance have differing interior construction because of the vastly different temperature of the hot ore and the coal being injected.

The construction of an injection lance for carbonaceous material, identified as 27a, is illustrated in FIGS. 2 to 4 and 7 to 10. As shown in these figures lance 27a comprises a central core tube 31 through which to deliver the solids material and an annular cooling jacket 32 surrounding the central core tube 31 throughout a substantial part of its length. Central core tube 31 is formed of low carbon steel tubing 33 throughout most of its length but its forward end is fitted with a replaceable extension or nozzle tube 34 which projects as a nozzle from the forward end of the cooling jacket 32.

Central core tube 31 is internally lined through to the forward end part 34 with a ceramic lining 37 formed by a series of cast ceramic tubes. The rear end of the central core tube 31 is connected through a coupling 38 to a coal delivery system through which particulate coal is delivered in a pressurised fluidising gas carrier, for example nitrogen.

Annular cooling jacket 32 comprises a long hollow annular structure 41 comprised of outer and inner tubes 42, 43 interconnected by a front end connector piece 44 and an elongate tubular structure 45 which is disposed within the hollow annular structure 41 so as to divide the interior of structure 41 into an inner elongate annular water flow passage 46 and an outer elongate annular water flow passage 47. Elongate tubular structure 45 is formed by a long carbon steel tube 48 welded to a machined carbon steel forward end piece 49 which fits within the forward end connector 44 of the hollow tubular structure 41 to form an annular end flow passage 51 which interconnects the forward ends of the inner and outer water flow passages 46, 47. The rear end of annular cooling jacket 32 is provided with a water inlet 52 through which a flow of cooling water can be directed into the inner annular water flow passage 46 and a water outlet 53 from which water is extracted from the outer annular passage 47 at the rear end of the lance. Accordingly in use of the lance cooling water flows forwardly down the lance through the inner annular water flow passage 46 then outwardly and back around the forward annular end passage 51 into the outer annular passage 47 through which it flows backwardly along the lance and out through outlet 53. This ensures that the coolest water is in heat transfer relationship with the incoming solids material and enables effective cooling of both the solids material being injected through the central core of the lance as well as effective cooling on the forward end and outer surfaces of the lance.

The outer surfaces of the tube 42 are machined with a regular pattern of rectangular projecting bosses 54 each having an undercut or dove tail cross section so that the bosses are of outwardly diverging formation and serve as keying formations for solidification of slag on the outer surfaces of the lance. Solidification of slag onto the lance assists in minimising the temperature in the metal components of the lance. It has been found in use that slag freezing on the forward or tip end of the lance serves as a base for formation of an extended pipe of solid material serving as an extension of the lance which further protects exposure of the metal components of the lance to the severe operating conditions within the vessel.

The lance is mounted in the wall of the vessel 11 via a mounting structure 61 comprising an outer annular or tubular part 60 extended about the cooling jacket and having a double walled construction so as to enclose an annular space 70 between these walls. The tubular part 60 fits within a tubular lance mounting bracket 62 welded to the shell of vessel 11 so as to project upwardly and outwardly from the vessel and provided at its upper end with an end flange 63. Lance mounting structure 61 is connected to the rear end of the outer tube 42 of annular cooling jacket 32 via an annular ring 64 and it also includes an annular mounting flange 65 which can be clamped to the flange 63 at the end of mounting tube 62 via clamping bolts 66. A split spacer ring 67 is fitted between the flanges 63, 65 to hold them apart when the clamping bolts 66 are tightened. The arrangement is such that the forward part of the outer sleeve 60 of structure 61 extend through to the inside of the vessel wall.

Figure 2:
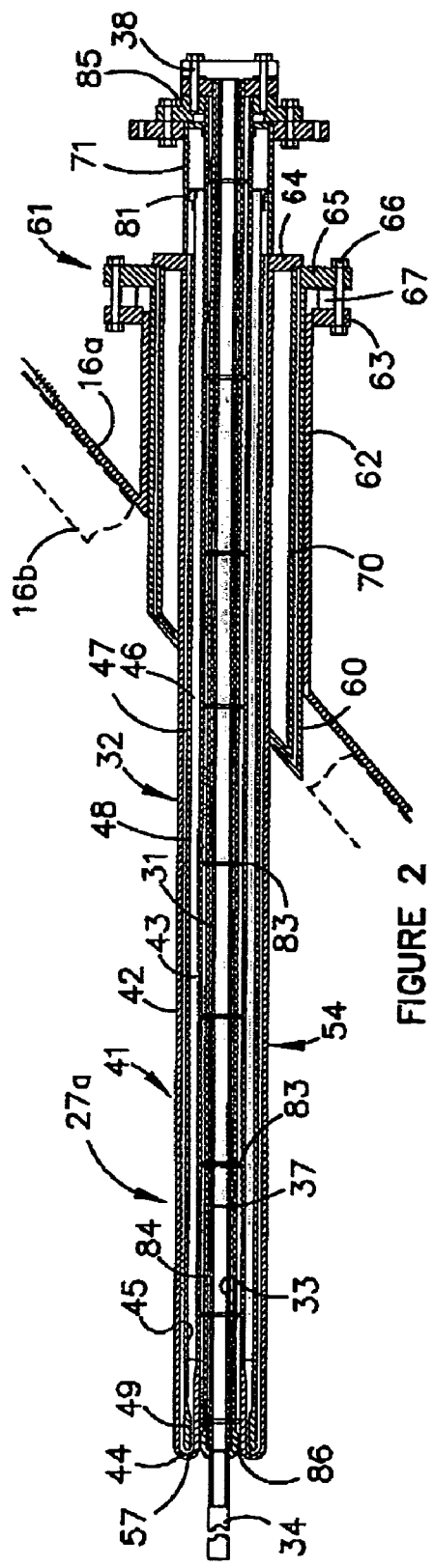
FIG. 2 is a longitudinal cross-section through one of the solids injection lances for injecting coal into the vessel.
Figure 3:
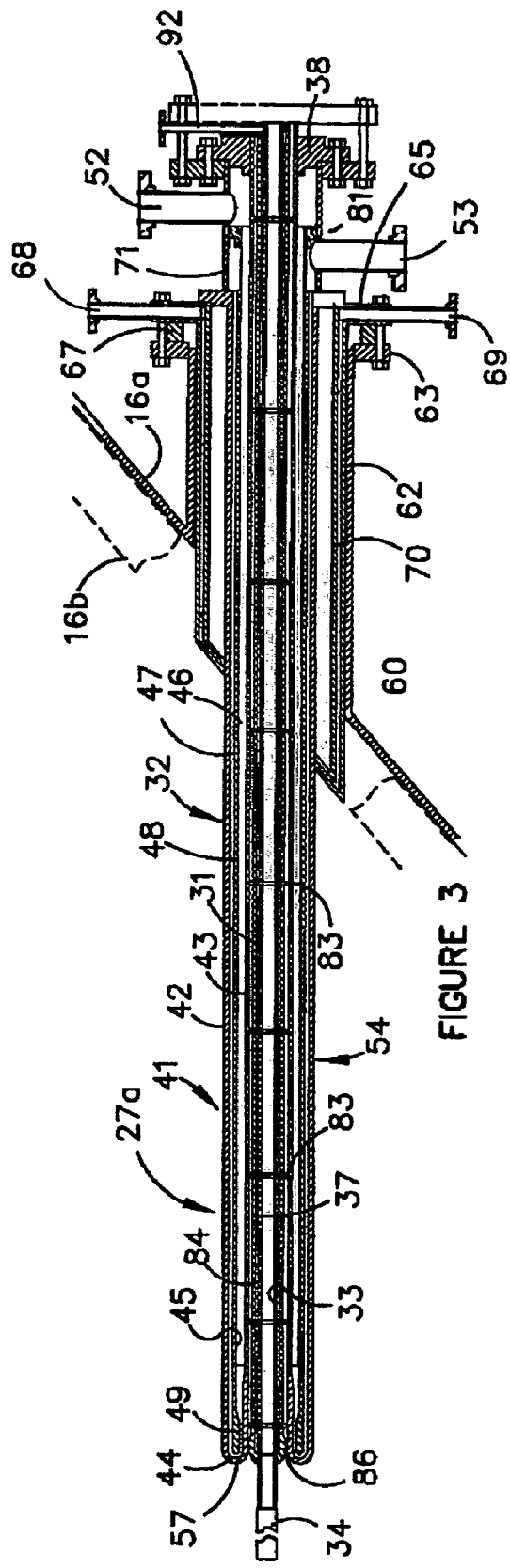
FIG. 3 is a cross-section through a rear part of the lance shown in FIG. 2.
Figure 4:
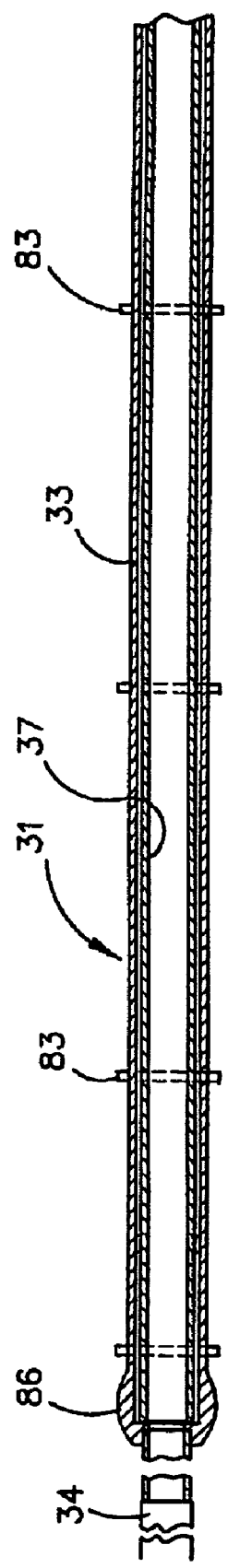
FIG. 4 is a longitudinal cross-section through part of an inner core tube assembly of the lance shown in FIG. 2.

As seen in FIG. 2, the vessel wall at this location is formed by the steel barrel shell 16a and an internal refractory lining 16b and the forward end of sleeve 60 is inclined at an angle to the central longitudinal axis of the lance so as to be flush with the inner refractory surface.

The tubular part 60 of mounting structure 61 is water cooled, cooling water being supplied through a water inlet 68 and returned through a water outlet 69 at the rear end of the mounting sleeve. As particularly shown in FIGS. 7 to 9, sleeve 60 is double walled having inner and outer walls 60A, 60B and the interior space 70 between the walls is partitioned by longitudinal partitions 80 which divide the interior space into a series of longitudinally extending circumferentially spaced water flow passages 90 through which water from the inlet 68 flows sequentially to the outlet 69.

A tubular housing 71 extending rearwardly from the mounting ring 64 of mounting structure 61 houses the rear end of the intermediate tube 48 of jacket 32 and the rear end of the core tube 31 of the lance. Housing 71 carries the cooling water inlet 52 and outlet 53 for the passage of cooling water to and from the lance cooling jacket 32. A flexible annular connecting structure 81 connects the rear end of the intermediate tube 48 of the water jacket with the housing tube 71 so as to separate the inward and outward water flow passages within the housing and to also permit relative longitudinal movement between the inner and outer tubes and the intermediate tube of the water jacket due to differential thermal expansion and contraction in the components of the lance.

The rear end of tubular housing 71 provides a mounting for the rear end of the inner tube 43 of the annular cooling jacket.

Core tube 31 is held in spaced apart relationship within annular cooling jacket 32 by a series of spacer collars 83 projecting outwardly from the central core tube at longitudinally spaced locations along the core tube to engage the inner periphery of the inner tube of the annular cooling jacket so as to form an annular gas flow passage 84 between the central core tube and the annular cooling jacket. A purge gas inlet 85 is provided at the rear end of the lance for admission of a purge gas such as nitrogen to be admitted into the gas flow passage 84 to flow forwardly through the lance between the core tube and the annular cooling jacket to exit the lance at the forward end of the cooling jacket.

The central core tube is fitted with a bulbous projection 86 in the region of the forward end of the cooling jacket to provide a controlled nozzle opening between the core tube and the water jacket to control the purge gas flow rate. The spacer collars 84 are formed so as to leave circumferentially spaced gaps between the outer peripheries and the inner periphery of the cooling jacket to allow for free flow of purge gas through the annular purge gas flow passage 84. One of the end collars 83 is located closely adjacent the bulbous projection 86 so as to provide accurate location of that projection within the forward end of the outer cooling jacket so as to create the controlled annular gap for the purge gas exit nozzle. The flow of purge gas is maintained to ensure that slag can not penetrate the forward end of the nozzle between the core tube and the outer water jacket. If slag were to penetrate the lance in this region it would immediately freeze because of the water cooled outer jacket and the cold purge gas.

During operation of the lances slag will accumulate on the outer surfaces of the lance and the inner surface of the vessel. On shutdown the slag will solidify tending to bond the lance to the vessel. However with the illustrated mounting arrangement this bond can readily be broken to facilitate withdrawal of the lance. This can be achieved by loosening the clamping bolts 66 sufficiently to enable withdrawal of the split spacer ring 67. This then permits limited inward movement of the lance mounting sleeve within the mounting tube 62 so that the forward end of the mounting sleeve is moved inwardly from the wall of the vessel to break any slag accretions. This then allows the lance along with slag that has solidified on the outer tube 42 to be readily withdrawn through the enlarged opening provided for the tubular mounting 60.

Figure 5:
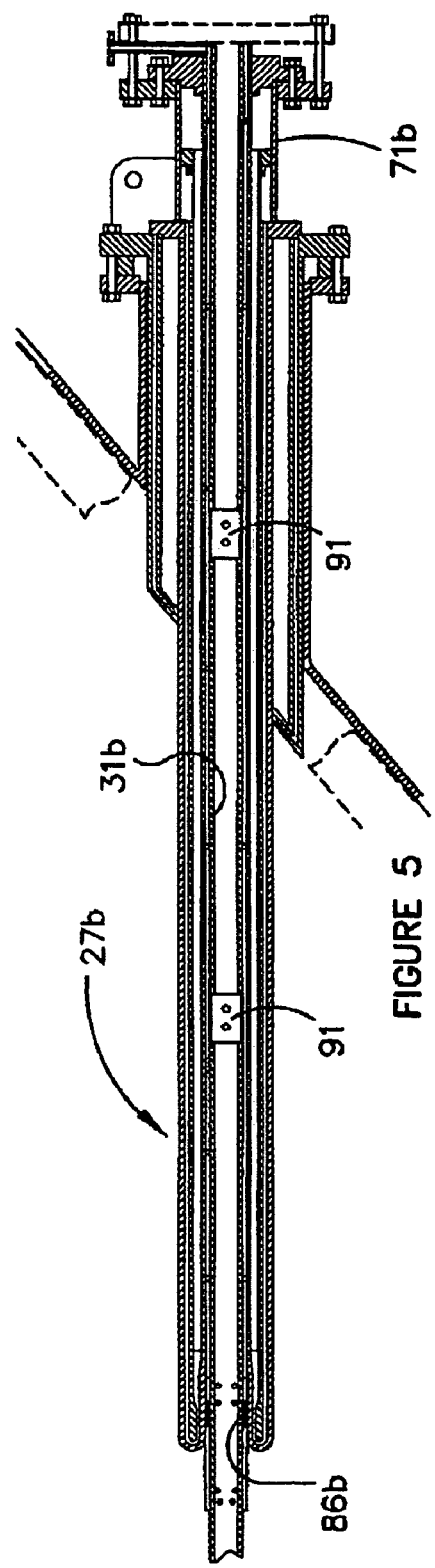
FIG. 5 is a longitudinal cross-section through a lance for injecting hot ore material into the vessel.
Figure 6:
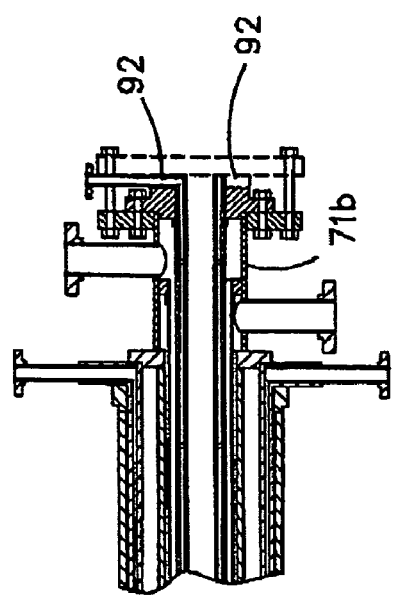
FIG. 6 is a cross-section through a rear part of the lance shown in FIG. 5.
Figure 7:
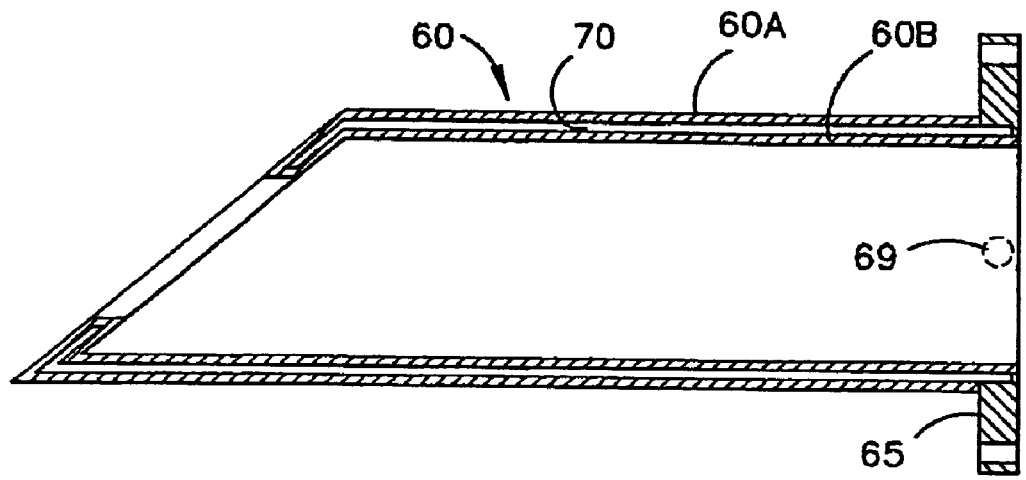
FIG. 7 is a longitudinal cross-section through a mounting sleeve component of the lance.
Figure 8:
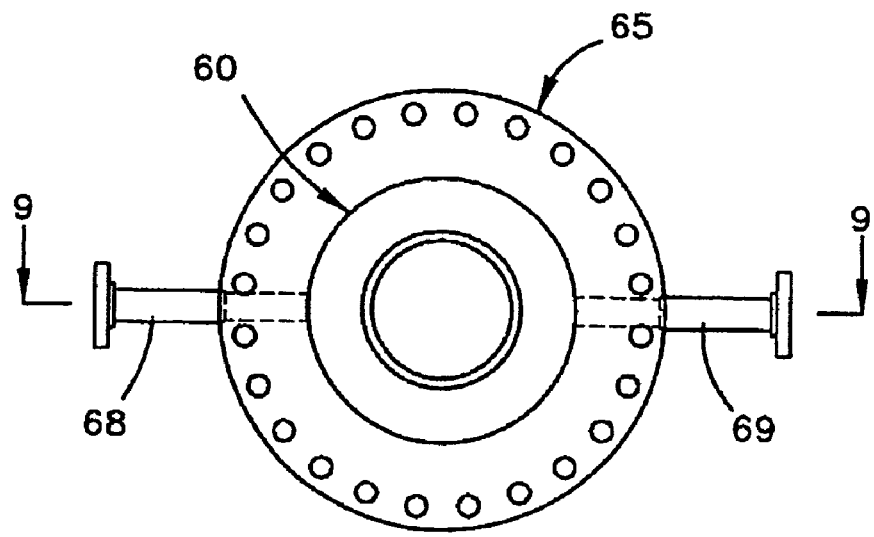
FIG. 8 is an end view of the mounting sleeve component.
Figure 9:
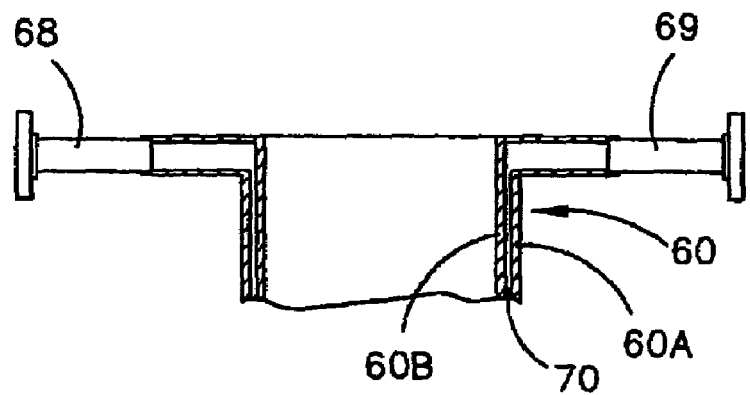
FIG. 9 is a cross-section on the line 9,9 in FIG. 8.

The hot ore injection lances may be of generally similar construction to the coal injection lances. However, as shown in FIGS. 5 and 6, the hot ore lance 27b has an inner core tube formed as a thick walled spun cast tube 31b with no liner. The tube 31b must be made in sections which are joined by split joining sleeves 91. Adjacent tubes can be aligned and connected through the joining sleeves by stitch welding. The forward end of the core tube 31b is provided with a projection 86b to set the size of the purge gas outlet nozzle. Because of the thicker core nozzle tube in the hot ore injection lance this projection is much smaller than the more bulbous projection of the coal delivery lance.

In a further modification, the hot ore injection lance is provided with a water cooled flange 92 to stop overheating of the housing tube 71b. This flange is sandwiched between the water cooled end flange of the lance housing and the flange on the end of the ore injection system which may also be water cooled.

The inner core tube of the hot ore injection lance is held in spaced apart relationship within the cooling jacket by a series of spacer collars projecting outwardly from the central core tube in the same fashion as in the coal lance construction. As in the coal lance, the space between the inner core tube and the water jacket provides an annular passage for flow of purge gas which exits the lance at the forward end of the cooling jacket.

The outer mountings for the two kinds of injection lance are identical so that both kinds of injection lances can be inserted into a common design housing. The water cooling of the mounting sleeve inhibits heat losses from the vessel through the lance mounting and also protects the lance against overheating at the mounting.

Figure 10:
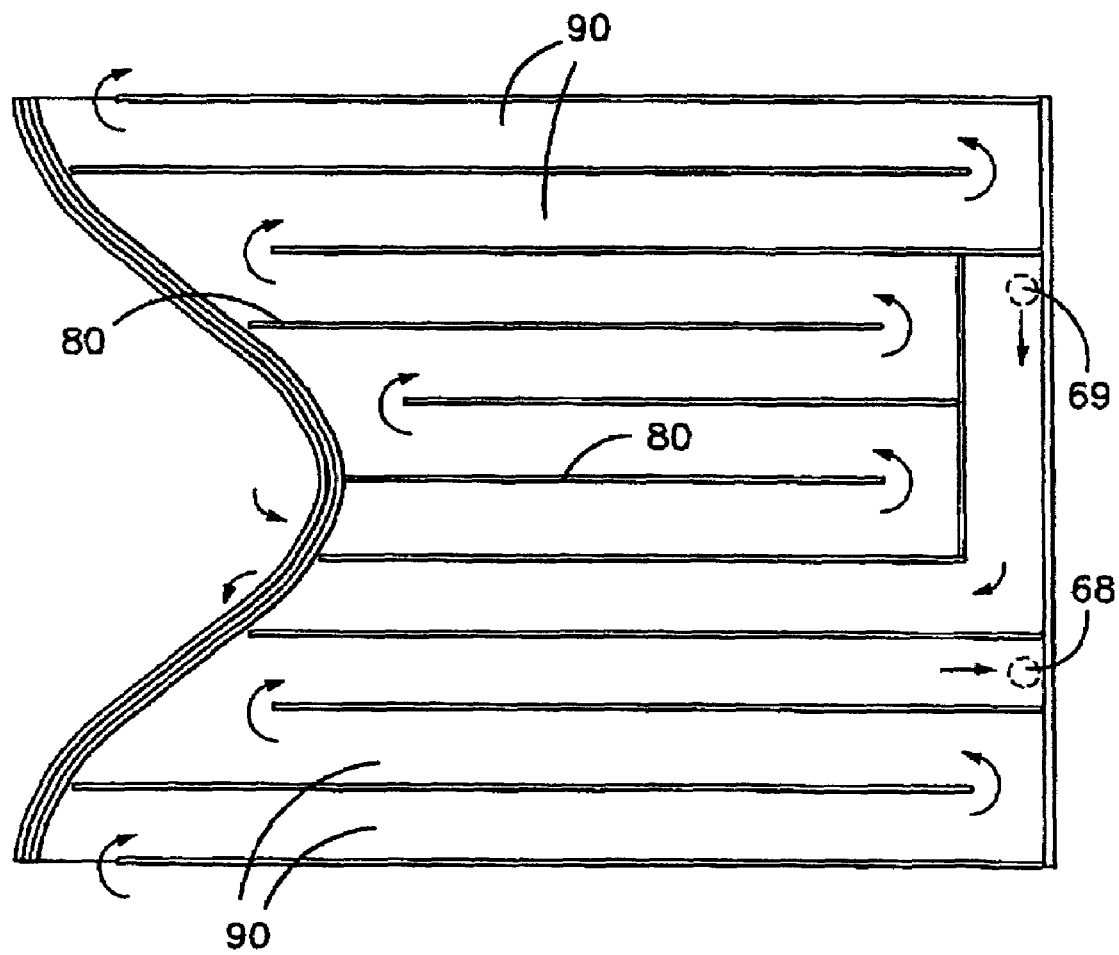
FIG. 10 is a developed view of an inner wall of the mounting sleeve showing partitioning of the annular space between those walls.
Figure 11:
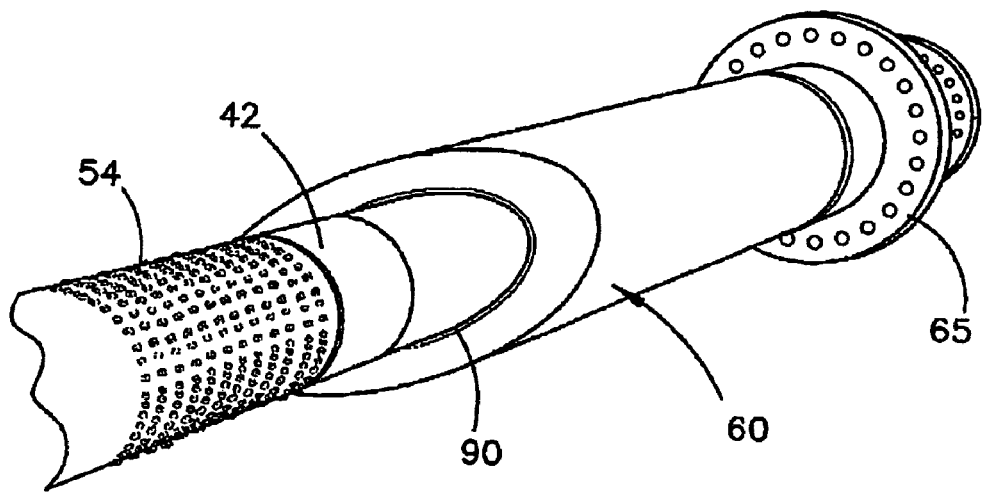
FIG. 11 is a perspective view of part of the lance.

As seen particularly in FIG. 10, the machined bosses 54 on the outer tube 42 of the cooling jacket stops short of the forward end of the tubular mounting 60 so that the forward end of the mounting can be welded at 90 to a smooth surface of tube 42 to produce a solid connection for the mounting.

Figure 12:
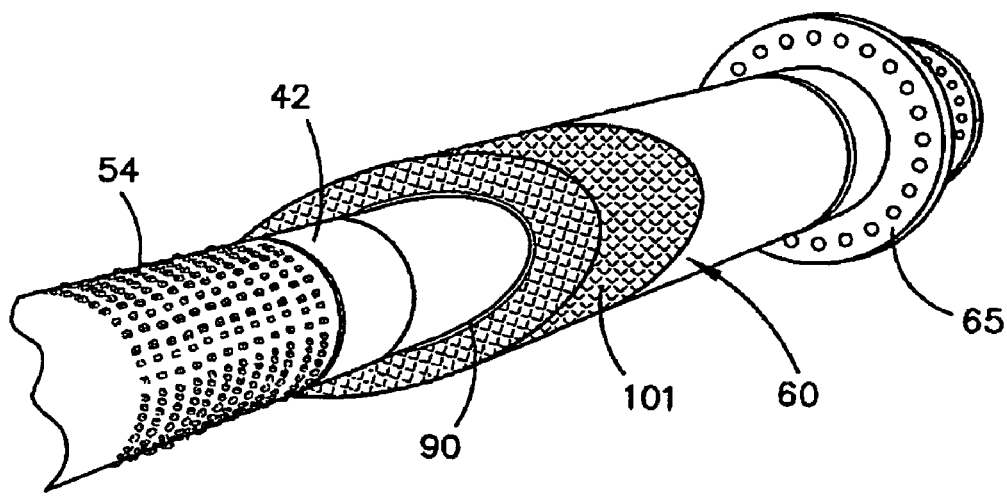
FIG. 12 illustrates a modified solids injection lance.

FIG. 12 illustrates a modified solids injection lance. The forward end of its outer annular part 60 is fitted with a covering annular disc 101 of refractory material to provide that front face against exposure to excessive temperature during start-up and lance replacement before there is a build up of slag within the vessel. The annular part 60 extends within the vessel wall so that the refractory disc 101 is flush with the inner face of the water cooled panel 101 and it serves as a refractory plug in the opening through that panel. The forward end of the outer annular part 60 is flush with at least the outer face of the water cooled panels.

The illustrated lances may typically be more than 5 meters in length and may have a total length including the extension or nozzle tube 34 of more than 7 meters. The outer radius of the cooling jacket 32 may typically be of the order of 100 to 150 mm and the outer diameter of annular part 60 may be at least 1.5 times that of jacket 32 and typically of the order of 450 to 550 mm. The lances are self-supporting within the annular part 60 so they are each supported at the required orientation by the mounting of the respective annular part 60 within one of the tubular mounting brackets 62. The lances extend inwardly from the shell of the vessel a horizontal distance of between one quarter and three quarters of the radial distance from the shell to the centre of the hearth.

The invention claimed is:

1. A metallurgical lance to extend downwardly and inwardly through a shell of a vessel into a slag layer of a bath of molten metal and slag contained in the vessel, and for injecting solid particulate material into said bath, the lance being self supporting in situ in the vessel and comprising:

a central core tube through which to pass the solid particulate material;

an annular cooling jacket surrounding the central core tube throughout a substantial part of its length, the annular cooling jacket having outer and inner tubes interconnected by a front end connection piece, which form internal water flow passages for flow of cooling water therethrough, the internal water flow passages having an inner water flow passage, through which cooling water can flow generally in a first direction, and an outer water flow passage, through which cooling water can flow in a second, opposing direction; and a mounting structure for mounting the lance on the vessel, the mounting structure having an outer annular part disposed about the annular cooling jacket at a position that is towards the rear end of the lance and that extends along the annular cooling jacket to a position that is spaced back from the forward end of the lance and, the outer annular part having a forward end with a front face that is inclined at an angle to a central longitudinal axis of the lance, and internal water flow passages for flow of cooling water therethrough;

wherein the diameter of the outer annular part is at least 1.5 times the diameter of the annular cooling jacket, and the inclined front face of the outer annular part enables mounting of the lance to the vessel in the downwardly and inwardly orientation with the front face flush with an inner surface of a refractory lining of the shell of the vessel, and the lance is adapted to extend inwardly from the shell a horizontal distance of between one quarter and three quarters of the radial distance from the shell to the centre of the vessel and into the slag layer.

2. The metallurgical lance of claim 1, wherein the outer annular part is connected to the annular cooling jacket at a position that is spaced back from the forward end of the lance.

3. The metallurgical lance of claim 2, wherein the outer annular part is spaced radially outwardly from the annular cooling jacket by front and rear end connectors so as to form an annular void between the outer annular part and the cooling jacket.

4. The metallurgical lance of claim 1, wherein the front face of the outer annular part is covered by a refractory material.

5. The metallurgical lance of claim 4, wherein the refractory material is a pre-formed refractory disc that is disposed adjacent the front face.

6. The metallurgical lance of claim 1, wherein the lance is more than 5 meters in length.

7. The metallurgical lance of claim 1, wherein the outer radius of the cooling jacket is in the range 100 to 150 mm.

8. The metallurgical lance of claim 1, wherein the outer annular part is double walled with water flow passages formed between the double walls, and wherein the outer annular part is spaced radially outwardly from the annular cooling jacket by front and rear end connectors so as to form an annular void between the outer annular part and the annular cooling jacket.

9. The metallurgical lance of claim 8, wherein an annular space between the double walls of the annular part is partitioned to form the water flow passages.

10. The metallurgical lance of claim 8, wherein the annular space between the double walls of the outer annular part is partitioned by longitudinally extending partitions to divide the space into longitudinally extending, circumferentially spaced, water flow passages interconnected for water flow sequentially through those passages.

11. The metallurgical lance of claim 1, wherein the annular cooling jacket is self supporting within the outer annular part.

* * * * *